United States Patent [19]

Kumazawa et al.

[11] Patent Number: 4,880,290
[45] Date of Patent: Nov. 14, 1989

[54] OPTO-ELECTRONIC DEVICE AND METHOD FOR PRODUCING THE DEVICE

[75] Inventors: Tetsuo Kumazawa, Ibaraki; Makoto Shimaoka, Ushiku; Kazuyuki Fukuda, Ibaraki; Eiichi Adachi, Mitaka, all of Japan

[73] Assignee: Hitachi, Ltd., Tokyo, Japan

[21] Appl. No.: 99,072

[22] Filed: Sep. 21, 1987

[30] Foreign Application Priority Data

Sep. 19, 1986 [JP] Japan .................................. 61-219526

[51] Int. Cl.⁴ ............................................... G02B 6/42
[52] U.S. Cl. ................................................... 350/96.20
[58] Field of Search ............... 350/96.20, 96.15, 96.17; 250/227, 552; 357/17, 19, 30, 74, 80

[56] References Cited

U.S. PATENT DOCUMENTS 4,696,537 9/1987 Bauer et al. ....................... 350/96.20
4,756,592 7/1988 Sasayama et al. ............ 350/96.18 X Primary Examiner—John D. Lee
Assistant Examiner—Phan T. Heartney
Attorney, Agent, or Firm—Antonelli, Terry & Wands

[57] ABSTRACT

An optical fiber apparatus having an optical fiber jacket guide for receiving and guiding an optical fiber therethrough to enable proper optical coupling with an optical component of an opto-electronic package device. An optical fiber core extends through the jacket guide and has a coating material coated thereon and extending within at least a part of the jacket guide. At least a part of the coating material within the jacket guide has an irregular peripheral surface and adhesive within the jacket guide bonds at least the coating material and the jacket guide.

27 Claims, 5 Drawing Sheets

OPTO-ELECTRONIC DEVICE AND METHOD FOR PRODUCING THE DEVICE

BACKGROUND OF THE INVENTION

The present invention relates to an opto-electronic device with an optical fiber jacket for guiding an optical fiber and for maintaining the optical fiber therein. More particularly, the opto-electronic device may be, for example, a semiconductor laser package or the like. In a conventional opto-electronic device, an end portion of an optical fiber cable formed of a core and cladding or coating material thereon has a portion of the coating material removed and inserted into an optical fiber jacket guide wherein the optical fiber is retained. That is, an optical fiber core and coating material are fixed within the jacket by epoxy resin or by adhesive after inserting a glass pipe into the jacket guide. The core of the optical fiber cable is formed of silica glass or the like and has a high refractive index.

In prior art constructions, the optical fiber core and the coating material which coating material is made of a resin such as nylon, polyester or the like are fixed in the jacket guide by an epoxy resin. The jacket guide is made of metal materials such as ferrous metal or copper and in view thereof, difficulties are encountered in achieving good adhesive characteristics due to the differences of the metal materials and the epoxy resin.

The inventors have determined that additionally, a delamination phenomenon is generated not at the bonded surface between the epoxy resin and the jacket guide, but rather at the bonded surface between the epoxy resin and the coating material where organic materials contact one another. As delamination of the bonded surface increases, the coating material moves toward the outside direction in that the coating material recedes from the inside of the package. Due to such receding, delamination easily generates at the end portion of the coating material also. Accordingly, the optical fiber core becomes uncovered and the package main body, especially the jacket guide, and the coating material are connected only by the optical fiber core. Therefore, the optical fiber core receives force directly such that breakage of the optical fiber core easily results.

The inventors have determined that such phenomenon is caused by a contraction force generated by strain remaining in the coating material which coats the optical fiber core. This contraction increases as a result of the opto-electronic package undergoing repeated cycles of high and low temperature changes such that even though breakage of the optical fiber does not occur, the optical fiber core contracts such that a material such as solder fixing the end of the core in relation to a light emitting element or the like is deformed to the extent that a positional or attitude difference occurs between the end point of the core and such light emitting element and, for example, a decrease in light output power occurs due to this positional or attitude difference.

SUMMARY OF THE INVENTION

It is, therefore, an object of the present invention to provide an opto-electronic device which eliminates the above-mentioned disadvantages of the prior art constructions and a method for producing such device.

In accordance with the present invention, the disadvantages in the prior art can be overcome by providing the coating material of the optical fiber core in the region of the optical fiber jacket guide with an irregular or roughened surface such as a screw thread like groove, annular grooves, axial grooves or lattice form. More particularly, the roughened surface may be obtained by sandpaper, plasma etching or the like.

In accordance with the present invention, an opto-electronic device is provided having a package containing optical components therein, an optical fiber jacket guide penetrated and fixed at a side wall of the package, and an optical fiber core extending through the optical fiber jacket guide and having an end position for coupling with an optical component of the package for optically coupling therewith wherein a coating material is provided on at least a part of the optical fiber core within the optical fiber jacket guide and a resin is provided between the coating material and the optical fiber jacket guide, the peripheral surface of the coating material within the optical fiber jacket guide having an irregular surface. The resin between the coating material and the jacket guide may be in the form of an adhesive.

According to a feature of the present invention, the roughening of the surface of the coating material is obtained by plasma etching. When the surface of the coating material is actively roughened so as to form concave and convex portions, the bonding area of an adhesive is increased by the concave and convex portions as opposed to a smooth surface for such coating material with the adhesive entering the concave and convex parts such that the bonding strength of the surface of the coating material can be significantly improved.

According to another feature of the present invention, the irregular or roughened surface is provided in the form of grooves cut in the surface of the coating material which grooves are preferably formed in a spiral such as a screw thread type groove. However, such grooves may be in the form of annular grooves or axial grooves also. Additionally, a lattice or web-like form of grooves may be provided. With a grooved arrangement, the groove cutting region of the coating material is preferably formed inwardly from the end of the optical fiber jacket guide approximate to the interior of the package by length at least corresponding to the diameter of the guide hole. In such an arrangement, it is effective to form the grooves in the axial direction of the optical fiber guide. Since grooves are provided in the coating material in spiral form or in the axial direction, adhesive can be easily injected throughout the grooves so that a non-bonded region does not result.

According to the present invention, a contraction force of the coating material depends on its occupation ratio. Therefore, when the surface is roughened as by forming grooves such that the surface as concave and convex portions by groove cutting or the like, the volume of the coating material is decreased and the contraction force (corresponding to the decrease of the volume) can also be decreased. Such reduces the stress of the high stress coating material and accordingly, movement of the fiber core and delamination of the coating material due to the contraction force can be substantially eliminated. Especially surface volume reduction is effective in decreasing the residual stress as it is high in surface compared with inner of coating material.

That is, when the concave and convex portions are represented by deep cuts in the coating material as by way of a groove or the like, since the volume of the coating material is reduced, such effects a release and reduction of the residual strain in the coating material. In this manner, movement of the core or contraction of the coating material with respect to the fiber jacket guide and optical components of the package is avoided and a jacket guide which is extremely stable for optical devices enabling appropriate assembly of optical fibers in the form of connectors, laser diode modules or the like can be provided.

The above and other objects, features and advantages of the present invention will become more apparent from the following description when considered in conjunction with the accompanying drawings which show, for purposes of illustration, several embodiments in accordance with the present invention.

DETAILED DESCRIPTION OF THE PREFERRED EMBODIMENTS

Figure 1:
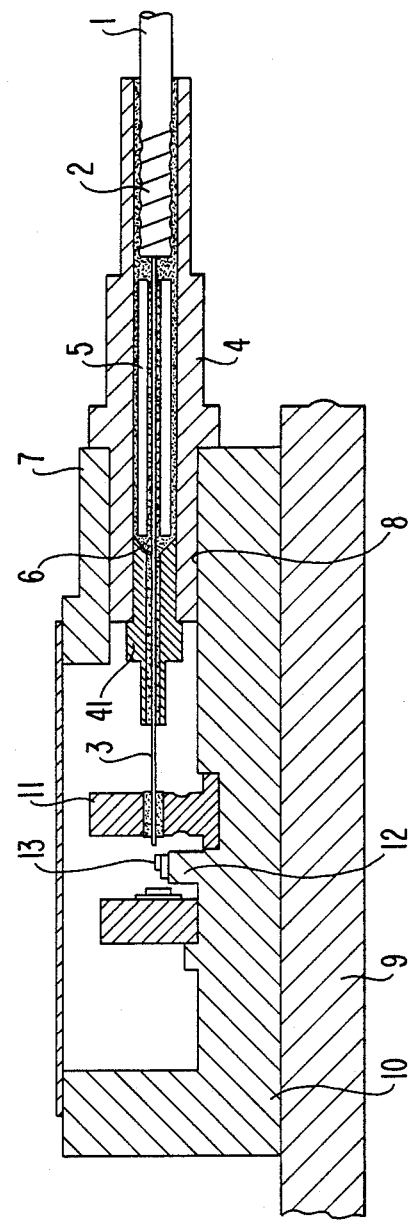
FIG. 1 is a longitudinal cross-sectional view of an opto-electronic device in accordance with the present invention.

Referring now to the drawings wherein like reference numerals are utilized throughout the various views to designate like parts, FIG. 1 illustrates an opto-electronic device in accordance with the present invention. The opto-electronic device includes a package 10 having a side wall 7 through which an optical fiber jacket guide 4 penetrates and is fixed therein. An optical fiber core 3 is exposed within the package 10, but is covered by a coating material 1 of nylon in the region of the optical fiber jacket guide 4 as well as outside of the package. The optical fiber jacket guide 4 has a first diameter at the entrance portion thereof for enabling receipt of the optical fiber core 3 having the coating material 1 thereon and a reduced diameter portion at the exit portion thereof for enabling receipt and passage of the exposed optical fiber core 3 therethrough. Such exit portion may be formed by a separate member 41. A glass pipe 5 is also disposed within the jacket guide 4 and the exposed optical fiber core 3 extends therethrough and outwardly from the exit member 41 toward the region of a laser diode 13 serving as an optical component of the package and disposed on a submount 12 of the package. The optical fiber core 3 penetrates a fixing member 11 disposed between the laser diode 13 and the end of the jacket guide and is supported in the fixing member 11 by a material such as a solder so that the laser diode 13 and the end of the optical fiber core 3 proximate thereto are optically coupled with a predetermined positional or attitude relationship. The upper portion of the package 10 is provided with a cover fixed thereto by resistance welding, for example, with the bottom portion of the package 10 being mounted on a radiating substrate 9.

Figure 2:
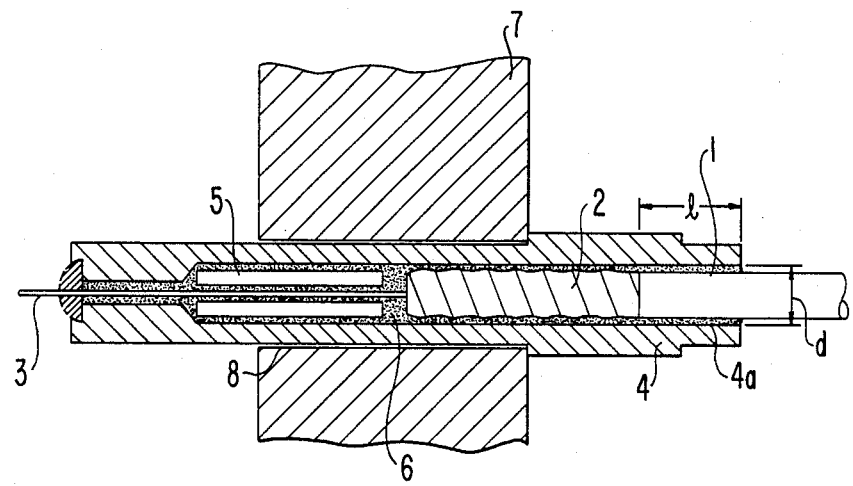
FIG. 2 is an enlarged longitudinal cross-sectional view of a optical fiber jacket guide having the optical fiber core with coating material thereon as illustrated in FIG. 1.

As more clearly illustrated in FIG. 2, the coating material 1 of nylon or the like only extends partially within the optical fiber jacket guide 4 and an adhesive such as an epoxy resin 6 fills the region between the inner surface of the optical fiber jacket guide, the optical fiber core, coating material and glass pipe. As shown, the coating material within the region of the optical fiber jacket guide is provided with an irregular or roughened surface illustrated in FIGS. 1 and 2 as a screw thread type groove 2 which screw thread type groove may be obtained by a die tool or the like. A suitable die tool employed for the screw thread type groove 2 cutting has a diameter of 1 mm and a pitch of 0.2 mm. The outer diameter of the fiber coating material 1 is 1 mm and a diameter at a root of the screw thread type groove 2 is 0.73 mm on an average. A region of approximately two-thirds of the length of the coating material 1 embedded in the jacket guide 4 is provided with the screw thread type groove 2 with the residual region of about one-third in length not having the cut or irregular surface. By providing the approximately one-third length which is not grooved, deterioration of the bending strength at the end portion is avoided. Generally, as illustrated in FIG. 2, the length l of the non-cut region within the optical fiber jacket guide 4 is a length greater than the diameter d of the guide hole 4a formed in the jacket guide 4 at the entrance portion thereof. The non-cut region avoids the resistive ability of the optical fiber to withstand bending which decrease is caused by the groove cutting.

Figure 3:
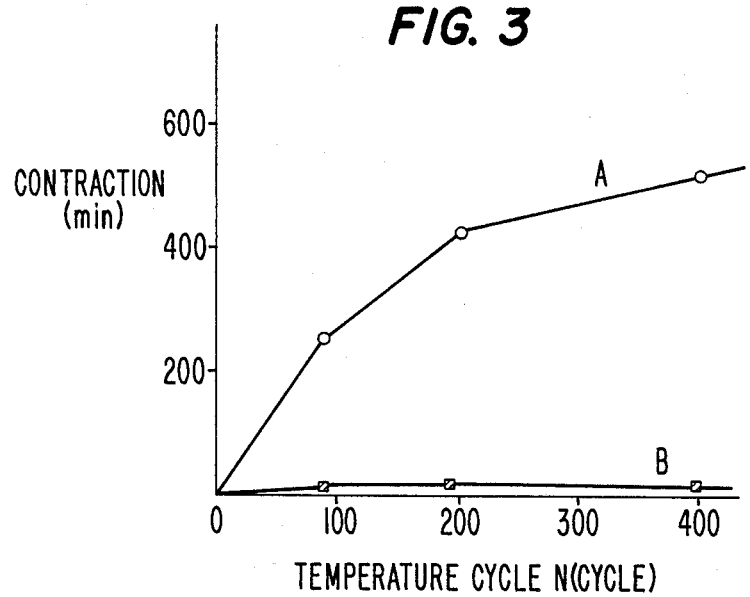
FIG. 3 is a diagram showing the reduction of contraction effects with respect to temperature cycles in accordance with the present invention.

The glass pipe 5 has an outer diameter of 1 mm with the fiber core 3 being inserted therein and the epoxy resin 6 is injected within the jacket guide 4 to effect from bonding therein. The jacket guide 4 is fixed to the stationery wall 7 of the package through a metal bonded layer 8. Effects of firmly bonding the jacket guide 4 with the coating material 1 having the screw thread type grooves formed in the surface thereof were examined with respect to contraction of the coating material 1 in relation to competitive cycles of heating and cooling with such results being illustrated in FIG. 3. The temperature range of the heating/cooling cycle extends from $-45°$ C. to $85°$ C. with the number of repetitions of such cycle being shown on the abscissa and the extent of contraction of the coating material 1 being shown on the ordinate. Curve A show the results of contraction in the jacket in which the fiber having a conventionally smooth coating material surface is embedded within the jacket guide while curve B shows the results for an optical fiber having a screw thread type groove 2 in the coating material surface and embedded in the jacket guide. The ordinate represents the measured results of contraction of delamination with respect to the jacket guide 4 when examined under a microscope. In prior art construction as represented by the curve A, the contraction increases as the number of heating/cooling cycles increase. In contradistinction, in accordance with the present invention as represented by the curve B, substantially no contraction occurs irrespective of the number of heating/cooling cycles so that the delamination of the coating material 1 is substantially eliminated and additionally, the attitude positioning of the end of the optical fiber core 3 with respect to the element to which is coupled, such as the laser diode 13, is maintained.

The jacket guide 4 as illustrated in FIGS. 1 and 2 was assembled in a laser diode module and evaluation with respect to temperature cycling and moisture resistance was performed. The result of such evaluation showed that with respect to a module using a optical fiber jacket guide with a smooth coating for the optical fiber within the jacket guide, the present invention as illustrated in FIGS. 1 and 2, prevents extrusion or delamination of the fiber core 3 and excellent effects are obtained with respect to the characteristics of the light output power.

Figure 4:
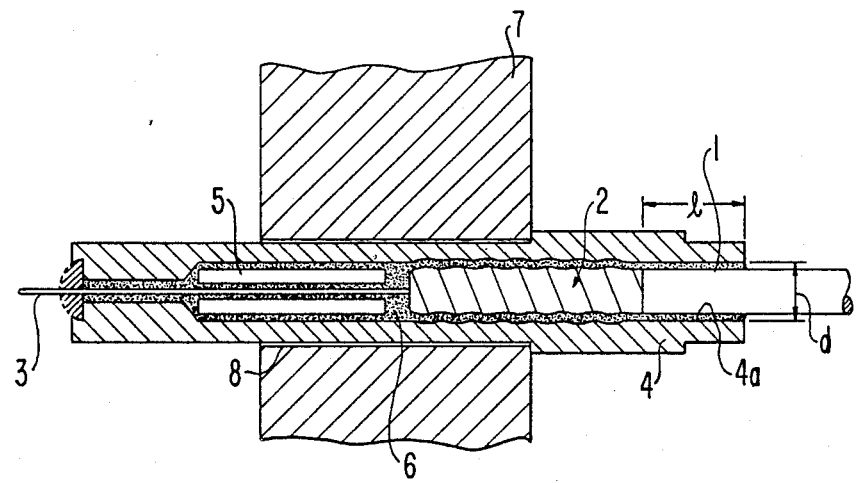
FIG. 4 is an enlarged longitudinal cross-sectional view of an optical fiber jacket guide and optical fiber with coating material in accordance with another embodiment of the present invention.

FIG. 4 illustrates another embodiment of the present invention wherein in addition to the surface of the coating material 1 of the fiber core 3 being provided with a screw thread type groove 2, the inner wall of the jacket guide 4 is also cut so as to provide a screw type groove 4b by use of a screw type or the like. A gap is provided between the outer surface of the coating material 1 corresponding to a male screw thread and the inner surface of the jacket guide 4 corresponding to a female screw thread with such gap being filled with an adhesive of epoxy resin 6 so as to fix and embed the various components. With this construction, the extent of contraction can be further reduced.

Figure 5:
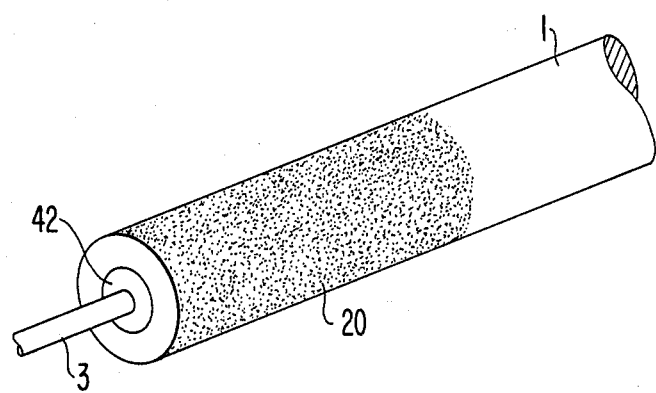
FIGS. 5, 6, 7 and 8 are perspective views of portions of an optical fiber and coating material having a roughened surface in accordance with other embodiments of the present invention.

FIG. 5 illustrates a further embodiment of the irregular surface of the coating material 1 for the optical fiber core 3 wherein a shock absorbing layer 42 of, for example, silicon gel is provided between the core 3 and the coating material 1. In this embodiment, in place of cutting of a screw thread groove 2, the fiber coating material 1 may be rotated while having sandpaper applied on its outer surface in the circumferential direction so as to form an irregular surface 20 of small roughness. In this case, at least a thickness of 50 μm of the surface layer of the nylon coating material 1 should be eliminated with the roughened portion being provided thereat. The coating material 1 and fiber optical core 3 are bonded firmly within the jacket guide 4 in a manner similar to that of FIG. 1.

Figure 6:
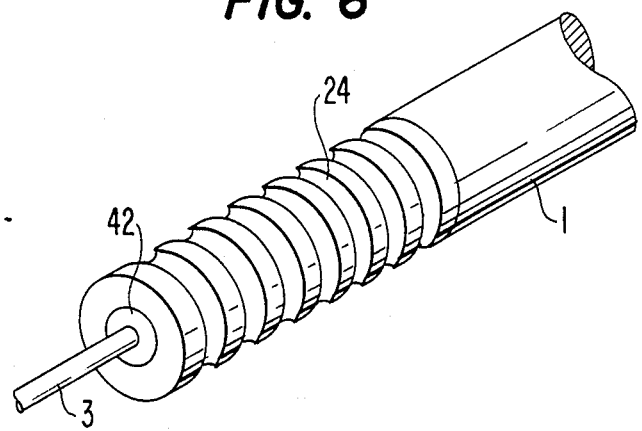

In accordance with another embodiment of the present invention, as illustrated in FIG. 6, rather than a screw thread type groove 2, annular grooves may be arranged at the end of the coating material 1 in the axial direction within the jacket guide. Such annular grooves 24 also provide a roughened surface for enabling the substantial elimination of delamination and contraction.

Figure 7:
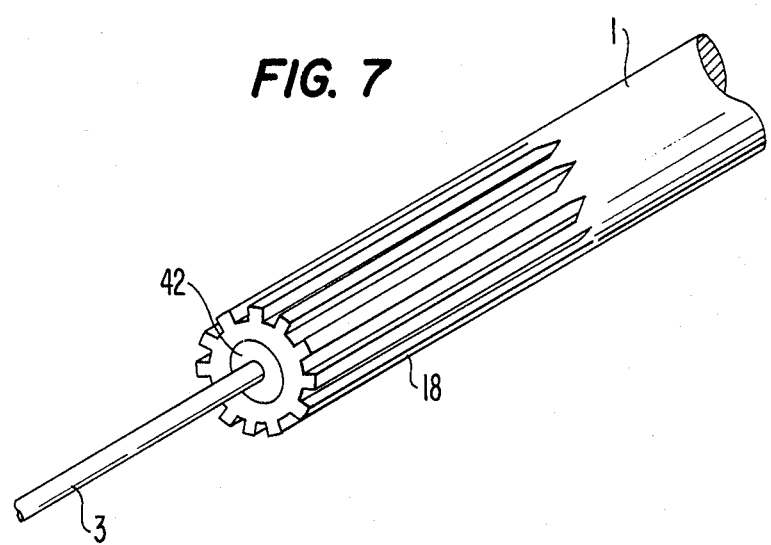

FIG. 7 illustrates a further embodiment of the present invention wherein the roughened surface is provided by a plurality of axial grooves 18 formed in parallel in circumferential form at the end of the coating material 1. That is, linear projections are formed in the axial direction and in FIG. 7, the grooves 18 are formed with a depth of 0.2 mm and a width of 0.3 mm at the end of the nylon coating material 1 of 1 mm in diameter using a cutter in the axial direction throughout the entire circumference of the coating material 1. In this arrangement, the adhesive within the jacket guide flows easily such that bonding of the jacket guide with the coating material 1 becomes more complete.

Figure 8:
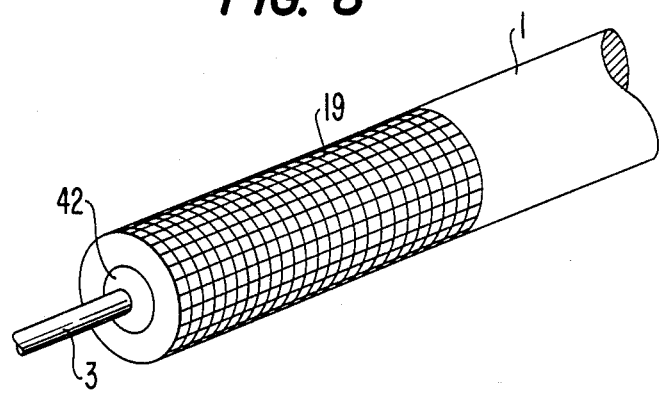

FIG. 8 illustrates another irregular surface arrangement for the coating material 1 in which the surface of the coating material 1 is partially roughened in a lattice or web-like surface. Such a lattice form may be obtained by providing a screw thread type groove in a manner similar to that illustrated in FIG. 1 as well as axial grooves in the manner illustrated in FIG. 7, for example.

It should also be recognized that while only the FIG. 4 embodiment, as described above, illustrated the provision of a roughened inner wall surface of the jacket guide 4 in the form of a corresponding screw thread, all of the illustrated embodiments may utilize such a construction with the attendant advantages as described above.

Figure 9:
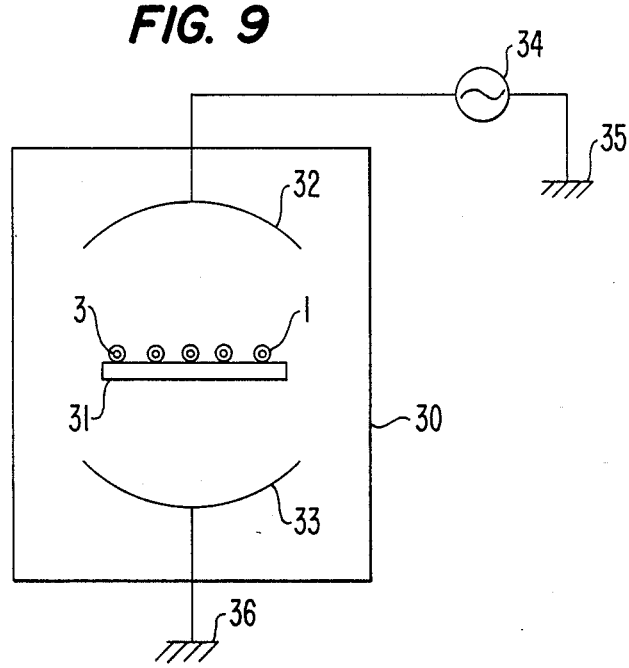
FIG. 9 illustrates an example of an apparatus for producing an optical fiber with a roughened surface coating material for an opto-electronic device in accordance with the present invention by plasma etching.

Furthermore, while the previous description has been directed to obtaining the roughened surface of the coating material by a machining process, the present invention is not limited thereto, and such roughened surface may be obtained by plasma etching. When plasma etching is utilized, for example, a plasma etching apparatus as illustrated in FIG. 9 is utilized. A coating material 1 made of nylon and coated on the optical fiber core 3, prior to treating of the coating material, is inserted in a chamber 30 after being washed or cleaned by alcohol. Plasma treating is performed for approximately five minutes to the surface of the coating material in an oxygen gas (0.5 Torr) in the chamber 30. The temperature is varied during the plasma treating process with the temperature preferably being about room temperature on the order of 28° C. at the starting state and up to 60–100° C., preferably about 72° C. with the mean value during treating being in the range of 50–70° C., preferably about 60° C. Member 31 within the chamber 30 serves for supporting the coating material 1 coated on the optical fiber core 3 with electrodes 32 and 33 being provided above and below the support 31 and serving for generating the plasma. An AC power source 34 supplies a high frequency electric power of, for example, 13 MHz with numerals 35 and 36 representing ground.

With the plasma etching, the surface of the coating material is increased in bonding strength even though grooves are not formed. Moreover, since a nylon surface of the coating material is subject to adhesion of gas and impurities which may cause surface delamination, the plasma treating effects removal of such gas and impurities and at the same time, the surface of the coating material is roughened to provide the improved bonding and anchoring effects.

It is recognized that the present invention is not limited to the embodiments described above and for example, the present invention can be applied to other components including optical fibers such as a laser diode package of DIL (Dual In Line) type, a connector or the like.

We claim:
1. An opto-electronic device comprising:
a package containing at least one optical component therein;
an optical fiber jacket guide penetrating and fixed to a wall of the package for enabling an optical fiber to pass into or out of the package;
an optical fiber core extending through the optical fiber jacket guide and positioned within the package so that an end thereof is optically coupled with the at least one optical component within the package;
a coating material coated on at least a portion of the optical fiber core extending through the optical fiber jacket guide, the coating material within at least a portion of the optical fiber jacket guide having means for relieving strain of the coating material, the strain relieving means including a grooved peripheral surface of the coating material; and means filling the region between the coating material and the optical fiber jacket guide within the optical fiber jacket guide for effecting bonding thereof;

whereby the grooved peripheral surface of the coating material within the optical fiber jacket guide substantially prevents contraction of the coating material in response to heat and cooling temperature cyclic variations and displacement of the optical fiber core within the package so as to maintain proper optical coupling of the end of the optical fiber core with the at least one optical component.

2. An opto-electronic device according to claim 1, wherein the grooved surface portion includes annular grooves extending circumferentially about the coating material.

3. An opto-electronic device according to claim 1, wherein the grooved surface portion includes grooves extending in the axial direction of the coating material and the fiber optic core.

4. An opto-electronic device according to claim 1, wherein the grooved surface portion includes a screw type thread groove.

5. An opto-electronic device according to claim 4, wherein the optical fiber jacket guide has an inner surface wall opposing the coating material and having a corresponding screw type threaded groove therein.

6. An opto-electronic device according to claim 4, wherein the screw-type thread groove has an average diameter at a root thereof of substantially 0.73 mm with a pitch of substantially 0.2 mm.

7. An opto-electronic device according to claim 1, wherein the optical fiber jacket guide has an opening through which the optical fiber extends from an entrance end to an exit end thereof, the opening at the entrance end having a first diameter, the grooved surface portion of the coating material extending within the optical fiber jacket guide for a length at least equal to the first diameter of the opening at the entrance end.

8. An opto-electronic device according to claim 7, wherein the grooved surface portion of the coating material is provided within the optical fiber jacket guide at least at a predetermined distance from the entrance end of the optical fiber jacket guide, the predetermined distance being greater than the first diameter of the opening at the entrance end.

9. An opto-electronic device according to claim 1, wherein the filling means is an epoxy resin adhesive.

10. An opto-electronic device according to claim 1, wherein the coating material is nylon.

11. An opto-electronic device according to claim 1, wherein the grooved surface portion has at least one groove with a depth of substantially 0.2 mm and a width of substantially 0.3 mm.

12. An opto-electronic device according to claim 1, wherein the grooved surface portion includes convex and concave parts arranged in a lattice configuration.

13. An optical fiber jacket apparatus comprising:
optical fiber jacket guide means for receiving and guiding an optical fiber therethrough;
a optical fiber core extending through the optical fiber jacket guide means;
a coating material coated on the optical fiber core over at least a portion of the optical fiber core extending within the optical fiber jacket guide means, and at least a portion of the coating material within the optical fiber jacket guide means having means for relieving strain of the coating material, the strain relieving means including a grooved peripheral surface of the coating material; and
adhesive within the optical fiber jacket guide means for filling at least the region between the coating material and an inner surface of the optical fiber jacket guide means for bonding at least the coating material thereto.

14. An apparatus according to claim 13, wherein the grooved surface portion includes annular grooves extending circumferentially about the coating material.

15. An apparatus according to claim 13, wherein the grooved surface portion includes grooves extending in the axial direction of the coating material and the optical fiber core.

16. An apparatus according to claim 13, wherein the grooved surface portion includes a screw type thread groove.

17. An apparatus according to claim 16, wherein the optical fiber jacket guide has an inner surface wall opposing the coating material and having a corresponding screw type threaded groove therein.

18. An apparatus according to claim 16, wherein the screw-type thread groove has an average diameter at a root thereof of substantially 0.73 mm with a pitch of substantially 0.2 mm.

19. An apparatus according to claim 13, wherein the optical fiber jacket guide has an opening through which the optical fiber extends from an entrance end to an exit end thereof, the opening at the entrance end having a first diameter, the irregular surface portion of the coating material extending within the optical fiber jacket guide for a length at least equal to the first diameter of the opening at the entrance end.

20. An apparatus according to claim 19, wherein the grooved surface portion of the coating material is provided within the optical fiber jacket guide at least at a predetermined distance from the entrance end of the optical fiber jacket guide, the predetermined distance being greater than the first diameter of the opening at the entrance end.

21. An apparatus according to claim 13, wherein the grooved surface portion has at least one groove with a depth of substantially 0.2 mm and a width of substantially 0.3 mm.

22. An apparatus according to claim 13, wherein the grooved surface portion includes convex and concave parts arranged in a lattice configuration.

23. A method for producing an opto-electronic device comprising the steps of:
providing an optical fiber jacket guide in a side wall of a package containing at least one optical component therein;
providing an optical fiber cable having an optical fiber core and a coating material coated on at least a portion of the optical fiber core;
forming a grooved surface on a part of the coating material adjacent an end of the optical fiber core for relieving strain of the coating material;
inserting the optical fiber cable into the optical fiber jacket guide so that a portion of the coating material having the grooved surface is disposed within the optical fiber jacket guide and at least an end of the optical fiber core extends outwardly from the optical fiber jacket guide toward the at least one optical component;
bonding at least the jacket guide and the grooved surface of the coating material together; and fixedly positioning the end of the optical fiber core and the at least one optical component within the package so as to provide optical coupling therebetween.

24. A method according to claim 23, wherein the step of forming a grooved surface on the coating material comprises subjecting the coating material coated on the optical fiber core to plasma etching.

25. A method according to claim 23, wherein the step of forming a grooved surface on the coating material coated on the optical fiber core includes cutting the surface of the coating material to form at least one groove therein.

26. A method according to claim 23, wherein the step of forming a grooved surface includes forming at least one groove having a depth of substantially 0.2 mm and a width of substantially 0.3 mm.

27. A method according to claim 23, wherein the step of forming a grooved surface includes forming a screw-type thread groove having an average root diameter of substantially 0.73 mm and a pitch of substantially 0.2 mm.

* * * * *